(12) United States Patent
Krupenkin et al.

(10) Patent No.: US 9,109,583 B2
(45) Date of Patent: *Aug. 18, 2015

(54) APPARATUS FOR FOOTWEAR-EMBEDDED MECHANICAL ENERGY HARVESTING USING MODULAR ELEMENTS

(71) Applicants: Thomas Nikita Krupenkin, Madison, WI (US); Joseph Ashley Taylor, Madison, WI (US)

(72) Inventors: Thomas Nikita Krupenkin, Madison, WI (US); Joseph Ashley Taylor, Madison, WI (US)

( * ) Notice: Subject to any disclaimer, the term of this patent is extended or adjusted under 35 U.S.C. 154(b) by 61 days.

This patent is subject to a terminal disclaimer.

(21) Appl. No.: 13/967,859

(22) Filed: Aug. 15, 2013

(65) Prior Publication Data

US 2014/0049049 A1      Feb. 20, 2014

Related U.S. Application Data

(60) Provisional application No. 61/684,296, filed on Aug. 17, 2012, provisional application No. 61/700,357, filed on Sep. 13, 2012.

(51) Int. Cl.
*F02B 63/04* (2006.01)
*F03G 5/06* (2006.01)
*H02K 7/18* (2006.01)
*H02K 35/02* (2006.01)
*H02N 1/08* (2006.01)

(52) U.S. Cl.
CPC .............. *F03G 5/06* (2013.01); *H02K 7/1876* (2013.01); *H02K 35/02* (2013.01); *H02N 1/08* (2013.01); *H02K 2213/12* (2013.01)

(58) Field of Classification Search
CPC .............................. H02N 11/002; H02N 99/00
USPC .......... 290/1 R; 310/11, 12.12; 417/410.1, 92; 36/1, 2.6, 137
See application file for complete search history.

(56) References Cited

U.S. PATENT DOCUMENTS

| | | | |
|---|---|---|---|
| 6,182,378 B1 * | 2/2001 | Sendaula | ............... 36/29 |
| 6,239,501 B1 * | 5/2001 | Komarechka | ............ 290/1 R |
| 6,982,501 B1 | 1/2006 | Kotha | |
| 7,446,450 B2 | 11/2008 | Boland | |
| 7,467,928 B2 | 12/2008 | Fakunle et al. | |
| 7,692,320 B2 | 4/2010 | Lemieux | |
| 7,898,096 B1 * | 3/2011 | Krupenkin | ............ 290/1 R |
| 7,989,197 B2 | 8/2011 | Yoo et al. | |
| 8,053,914 B1 | 11/2011 | Krupenkin | |
| 8,258,644 B2 | 9/2012 | Kaplan | |
| 2003/0151258 A1 | 8/2003 | Shin | |
| 2008/0009043 A1 | 1/2008 | Yoo et al. | |

(Continued)

*Primary Examiner* — Julio C. Gonzalez
(74) *Attorney, Agent, or Firm* — Wendy W. Koba

(57) ABSTRACT

An energy harvesting apparatus utilizes a modular structure to preserve the proper alignment between a chain of energy-producing elements and an energy-producing channel (within which the chain is located and free to slide along, creating electrical energy from mechanical movement). The channel includes a plurality of rigid modules that are separated by flexible segments of tubing. The rigid channel modules house the energy-producing electrodes and/or coils. The chain includes a plurality of rigid modules that are attached along a flexible string in a spaced-apart configuration. The rigid chain modules house the energy-producing magnets and/or conductive droplets. The combination of the flexible channel segments and chain string allow for freedom of motion of the apparatus (required for human locomotion, for example), while providing the desired "fixed" alignment between the rigid energy-producing modules.

10 Claims, 16 Drawing Sheets

(56) References Cited

U.S. PATENT DOCUMENTS

| | | |
|---|---|---|
| 2009/0283407 A1 | 11/2009 | Shah et al. |
| 2011/0008767 A1 | 1/2011 | Durack |
| 2012/0091004 A1 | 4/2012 | Abell et al. |
| 2012/0292915 A1 | 11/2012 | Moon |
| 2013/0140917 A1* | 6/2013 | Krupenkin et al. ............ 310/11 |
| 2014/0068973 A1* | 3/2014 | Krupenkin et al. ............ 36/136 |

* cited by examiner

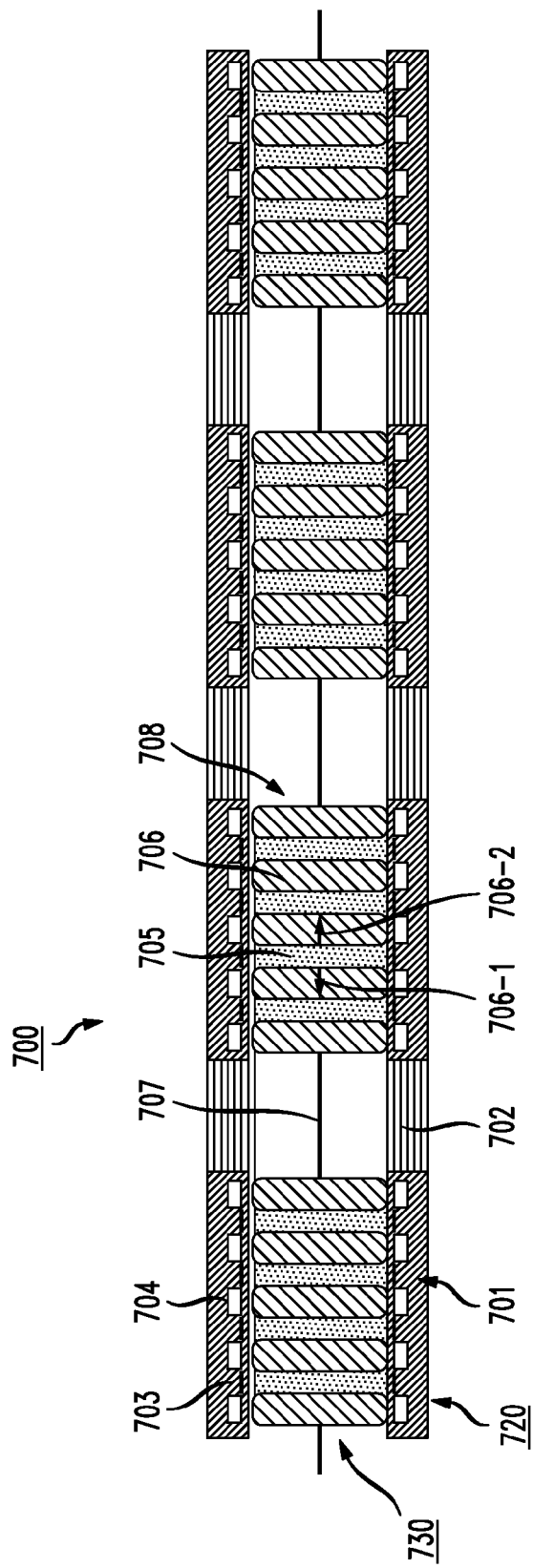

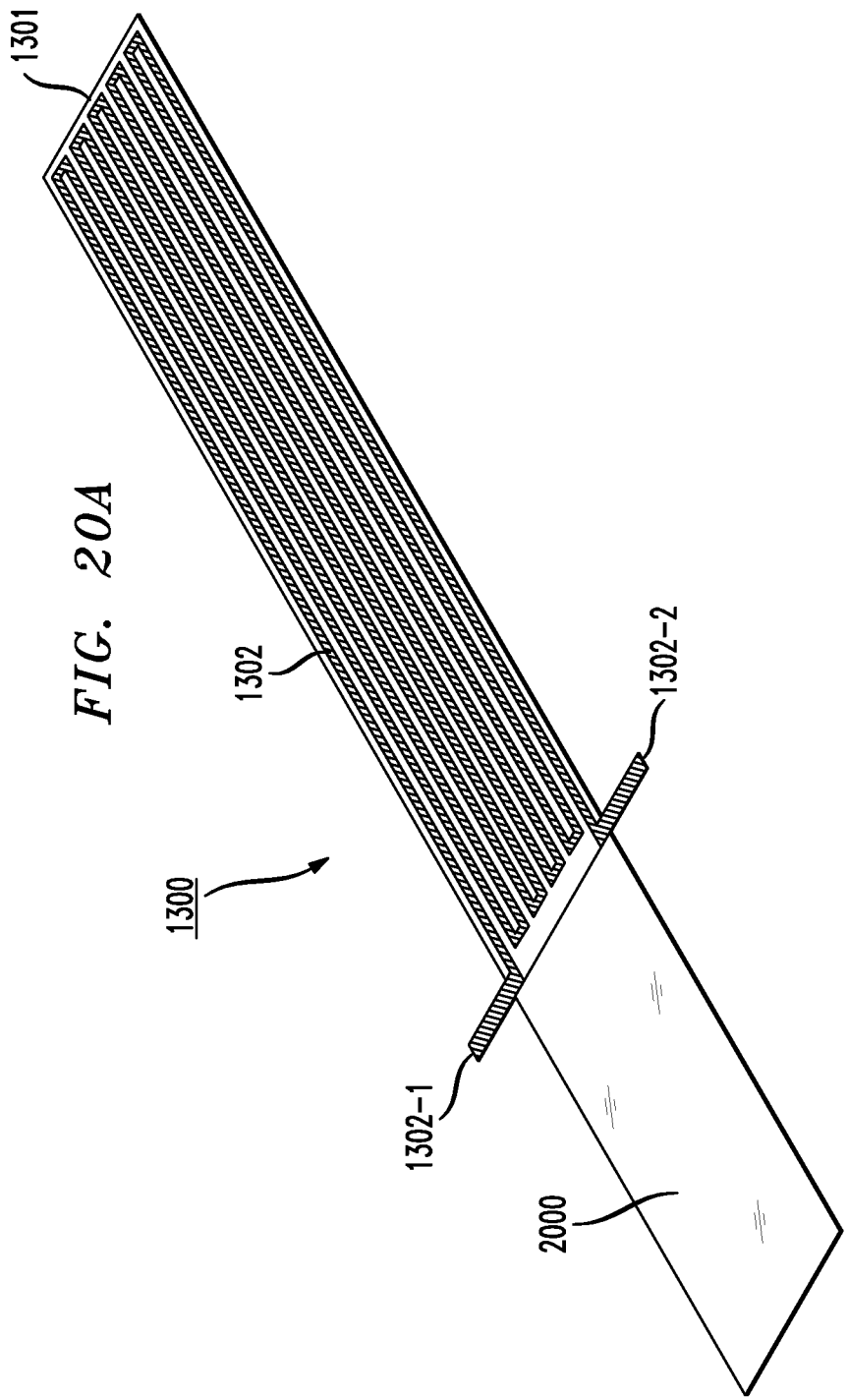

APPARATUS FOR FOOTWEAR-EMBEDDED MECHANICAL ENERGY HARVESTING USING MODULAR ELEMENTS

CROSS-REFERENCE TO RELATED APPLICATIONS

This application claims the benefit of U.S. Provisional Application Ser. No. 61/684,296 filed Aug. 17, 2012 and U.S. Provisional Application Ser. No. 61/700,357 filed Sep. 13, 2012, both of which are herein incorporated by reference.

TECHNICAL FIELD

The present invention relates to a mechanical arrangement for harvesting energy from activities such as walking or running and, more particularly, to an arrangement that utilizes a combination of substantially rigid modular elements and flexible elements, the combination maintaining the necessary range of motion required for human locomotion, while providing a certain degree of alignment between the energy-producing components.

BACKGROUND OF THE INVENTION

High-power harvesting of mechanical energy from human locomotion is a well known concept which has not been commercialized in the past due to the lack of a viable energy harvesting technology. Classical methods of mechanical-to-electrical energy conversion (such as electromagnetic, piezo-electric, and/or electrostatic) are not well suited for direct coupling with the forces and displacements typical in human locomotion. For example, the highly restricted size and form-factor of a footwear-embedded device prevents the use of traditional, mechanical transducers that are necessary to convert a broad range of aperiodic forces and displacements (typically encountered in locomotion) into a readily accessible form.

Recently, a new approach to energy harvesting using microfluidic devices that substantially alleviates the above-mentioned problems has been demonstrated. In particular, a high-power microfluidics-based energy harvester is disclosed in U.S. Pat. No. 7,898,096, entitled METHOD AND APPARATUS FOR ENERGY HARVESTING USING MICROFLUIDICS, inventor: Thomas Nikita Krupenkin, granted Mar. 1, 2011, and in U.S. Pat. No. 8,053,914, entitled METHOD AND APPARATUS FOR ENERGY HARVESTING USING MICROFLUIDICS, inventor: Thomas Nikita Krupenkin, granted Nov. 8, 2011, both of which are incorporated by reference herein in their entirety. The energy harvester as disclosed in these references generates electrical energy through the interaction of thousands of microscopic liquid droplets with a network of thin-film electrodes and is capable of providing several watts of power. In one preferred embodiment of described in U.S. Pat. Nos. 7,898,096 and 8,053,914, a train of the energy-producing droplets is disposed within a thin channel (creating what will be referred to as an "energy-producing channel") and is hydraulically actuated by a pressure differential (such as, for example, the movement of a foot) applied between the channel ends. Such an energy generation method provides an important advantage as it allows for efficient, direct coupling with a wide range of high-power environmental mechanical energy sources (including human locomotion).

A new method for energy harvesting using microfluidic devices that improves on the teaching of U.S. Pat. Nos. 7,898,096 and 8,053,914 has also been under development by the inventors and provides a new energy generation method and an apparatus that combine in a synergetic way the microfluidic-based electrical energy generation method based on the energy-producing channel concept and described in U.S. Pat. Nos. 7,898,096 and 8,053,914 with the classical magnetic method of electrical power generation based on Faraday's law of electromagnetic induction. One preferred embodiment of this method, as described in U.S. patent application Ser. No. 13/692,062, filed Dec. 3, 2012 and herein incorporated by reference, comprises a chain of special energy-producing elements (these elements being a set of magnets interleaved with a set of microfluidic droplets) which is adapted to freely slide along the energy-producing channel under the influence of a pressure differential applied between the channel ends as the result of hydraulic actuation. The energy-producing channel is formed to include alternating sets of dielectric members (which create energy when aligned with the microfluidic droplets) and electrical conductors (which create energy when aligned with the magnets). Energy generation is achieved by reciprocating motion of the chain within the energy-producing channel. Other preferred embodiments also utilize hydraulic actuation and includes the use of specialized expandable chain elements that allow for continuous revolving motion of the chain of energy-producing elements within the energy-producing channel. The resulting approach has a number of substantial advantages over the teaching of U.S. Pat. Nos. 7,898,096 and 8,053,914. In particular, it provides greatly increased power output and allows effective energy generation without the need for the external bias voltage source. This improves the harvester performance characteristics, enhances its reliability and simplifies the harvester design in comparison with the teaching of U.S. Pat. Nos. 7,898,096 and 8,053,914.

However, these methods of energy generation are not free from some shortcomings. In particular, in order to be compatible with conventional footwear, the energy-producing channel in these arrangements has to be flexible. This requirement, however, imposes severe restrictions on the dimensional stability of the energy-producing channel, as well as the chain of energy-producing elements. In particular, as the channel flexes (such as under the force of human locomotion), the channel walls alternately stretch and compress. This means that the relative position and spacing of the electrodes and coils embedded in the channel walls is dynamically changing, potentially creating misalignment between the energy-producing channel elements (electrodes and coils) on one side, and the chain of the energy-producing elements (magnets and microfluidic droplets) on the other side. This misalignment adversely affects power generation and thus leads to a lower energy harvesting efficiency. The problem equally affects both the reciprocating motion embodiments and the revolving motion harvester embodiments of the above-referenced arrangement.

Thus, need remains for a method and an apparatus that can preserve accurate alignment between the energy-producing chain and the coils/electrodes embedded in the channel walls (i.e., the "energy-producing channel"), without compromising the flexibility of channel itself, thereby improving the energy harvester device power output and increasing its efficiency.

SUMMARY OF THE INVENTION

The needs remaining in the prior art are addressed by the present invention, which relates to a mechanical arrangement for harvesting energy from activities such as walking or running and, more particularly, to an arrangement that utilizes a combination of substantially rigid modular elements and flexible tubing segments, the combination maintaining the necessary range of motion required for human locomotion, while providing a certain degree of alignment between the energy-producing components.

In particular, the present invention discloses a new energy harvesting apparatus that utilizes a modular structure to preserve the proper alignment between the chain of energy-producing elements and the energy-producing channel (including the coils and electrodes) without compromising the flexibility of the energy-producing channel.

In accordance with one embodiment of the present invention, an energy-producing channel is formed of a plurality of modules of substantially rigid material that are separated by flexible tubing segments. More particularly, the energy-producing channel comprises a sequence of rigid coil and electrode assemblies (hereinafter referred to as "rigid modules", or simply "modules") that are separated from one another by flexible tube segments. Similarly, the energy-producing chain of the inventive energy harvester comprises rigid assemblies of spaced-apart magnets and/or conductive droplets that are disposed on a flexible shaft (at times referred to as a "string"), where the energy-producing chain is adapted to slide along within the energy-producing channel. Since the rigid modules forming the energy-producing chain will not flex with the energy-producing channel, the alignment between the chain elements and the channel elements are preserved at all times.

Another important advantage of the arrangement of the present invention stems from the improved dimensional stability offered by the rigid modules. With this dimensional stability, the coils, electrodes, magnets and droplets may all be packed in a much tighter configuration, which leads to substantially improved power density. Indeed, in one embodiment, an individual "coil" may actually be formed of a plurality of turns of wire that are packed tightly together.

In a specific embodiment of the present invention, a magnetic shield layer may be formed on the outer surface of each rigid chain module, for those embodiments that utilize a combination of coils and magnets to generate energy. The shield functions to confine the field of the magnet elements and improve the energy conversion efficiency of the structure.

Another specific embodiment of the present invention, as will be described in detail below, utilizes a flexible circuit board member to form an energy-producing channel module. The circuit board is formed of a flexible dielectric material, covered with metal traces (forming the coil), embedded traces forming the electrode structure. This flexible circuit board element can be rolled into a cylindrical form that naturally creates a "rigid" structure (along the longitudinal axis of the cylinder) suitable for an energy-producing module.

In particular, one embodiment of the present invention may be defined as a modular apparatus for converting mechanical energy into electrical energy formed of an energy-producing channel comprising a plurality of rigid channel modules longitudinally disposed along the channel, with adjacent rigid channel modules separated by a section of flexible tubing, each rigid channel module being of like size, with each section of flexible tubing being of the same length, each rigid channel module including either one or both of a plurality of dielectric-coated electrodes and a plurality of conductive coils and an energy-producing chain disposed within the energy-producing channel and comprising a plurality of rigid chain modules disposed along and attached to a flexible string in a spaced-apart manner, each rigid chain module including either one or both of a plurality of magnets disposed in an alternating polarity configuration and a plurality of conductive droplets, wherein the movement of the energy-producing chain within the energy-producing channel provides for alignment between the plurality of rigid channel modules with the plurality of rigid chain modules, generating electrical energy by the alignment, while permitting flexing of the modular apparatus by the permissible movement of the sections of flexible tubing and the flexible string.

Another specific embodiment of the present invention can be defined as a method of converting mechanical energy into electrical energy comprising the steps of: (1) providing a chain of energy-producing rigid chain modules disposed in a spaced-apart relationship along a flexible string, each rigid chain module including either one or both of a plurality of magnets disposed in an alternating polarity configuration and a plurality of conductive droplets; (2) providing a energy-producing channel comprising a plurality of rigid channel modules separated by a plurality of flexible sections of tubing, each rigid module including either one or both of a plurality of dielectric-coated electrodes and a plurality of conductive coils; (3) inserting the energy-producing chain into the energy-producing channel and (4) using mechanical energy to translate the position of the chain with respect to the channel such that electromagnetic energy is created when the magnetic elements align and misalign with individual coils of the plurality of coils, or when the conductive droplets align and misalign with individual dielectric-coated electrodes of the plurality of electrodes.

Various other embodiments, aspects and advantages of the present invention will become apparent during the course of the following discussion and by reference to the accompanying drawings.

BRIEF DESCRIPTION OF THE DRAWINGS

Referring now to the drawings, where like numerals represent like parts in several views:

FIG. 7 illustrates an exemplary modular energy having arrangement formed in accordance with the present invention, with an energy-producing channel formed of a plurality of rigid modules separated by segments of flexible tubing, an energy-producing chain formed of a plurality of rigid modules attached along a flexible string in a spaced-apart relationship;

FIGS. 20A-20D illustrate an exemplary rigid channel module for magnetic elements that further includes a magnetic shield, where in this case FIG. 20A shows a first step in creating the rigid channel module from a flexible circuit board attached to a sheet of magnetic shielding material, FIG. 20B shows a next step, where the flexible circuit board is beginning to be rolled, FIG. 20C shows a following step, with the flexible circuit board rolled up to an edge where it joins the magnetic shielding material, and FIG. 20D shows the final rigid channel module, with the magnetic shield forming the outer surface of the module.

DETAILED DESCRIPTION

Figure 1:
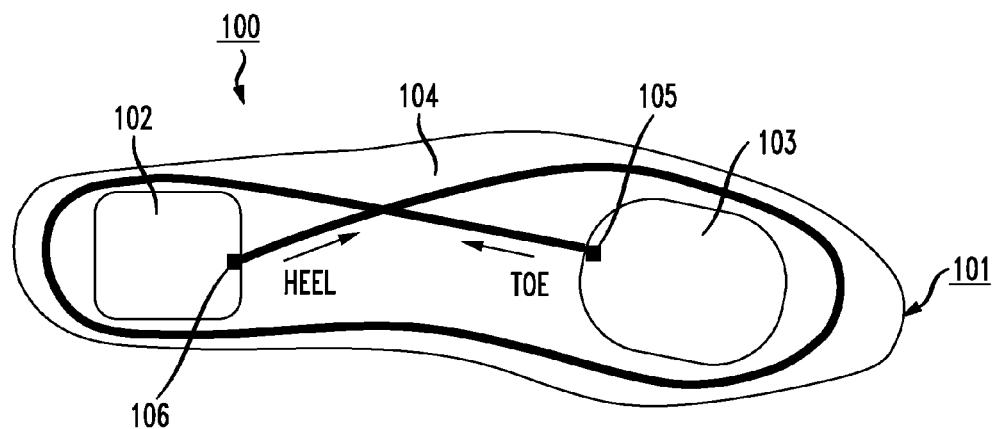
FIG. 1 presents a two-dimensional schematic view of one exemplary embodiment of an apparatus for capturing mechanical energy from human locomotion and converting it into electrical energy.

Prior to explaining the details of the "modular" construction of the energy harvester of the present invention, it is considered useful to review the prior types of energy-producing arrangements that have been developed and described in the above-referenced patents. FIG. 1 presents a two-dimensional schematic view of one exemplary embodiment of an apparatus 100 for capturing mechanical energy from human locomotion and converting it into electrical energy. Apparatus 100 is configured to produce reciprocating motion of an energy-producing chain inside an energy-producing channel as will be discussed in detail below.

In particular, apparatus 100 comprises an energy-producing channel 104, within which slides an energy-producing chain (not shown). In most arrangements, alternating sets of energy-producing dielectric-coated electrodes and energy-producing conductive coils are formed along the length of energy-producing channel 104. Referring to FIG. 1, apparatus 100 is seen to further comprise a pair of flexible chambers 102 and 103, each filled with an inert dielectric liquid, used as a hydraulic fluid for the purposes of the present invention (and simply referred to hereinafter as "fluid"). Chamber 102 is shown as located at the heel area (for example) and chamber 103 at a front area of midsole 101. Chambers 102 and 103 are connected to energy-producing channel 104 at ports 106 and 105, as shown.

During a heel strike, chamber 102 is compressed, displacing a quantity of fluid through port 106 and into channel 104. The flow of this fluid (that is, the inert dielectric liquid) causes a sliding motion of the energy-producing chain inside the energy-producing channel 104 in the direction from heel chamber 102 to toe chamber 103 (indicated by the arrow labeled "heel"). During toe-off, the flow of fluid is reversed, since chamber 103 will compress and displace a quantity of its fluid through port 105 and into energy-producing channel 104, causing the energy-producing chain enclosed within energy-producing channel 104 to move in the opposite direction (shown by the arrow labeled "toe" in FIG. 1).

Figure 2:
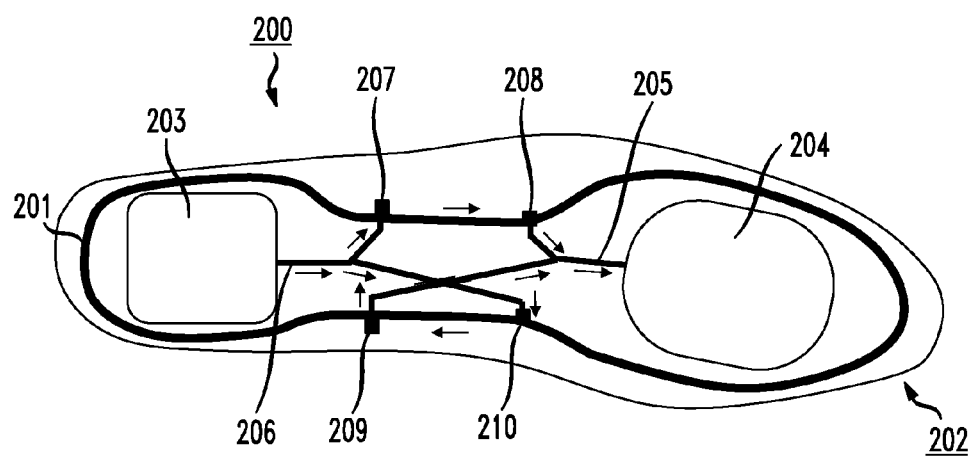
FIG. 2 presents a two-dimensional schematic view of another exemplary embodiment of an apparatus for capturing mechanical energy from human locomotion and converting it into electrical energy.

FIG. 2 presents a two-dimensional schematic view of another exemplary embodiment of an apparatus for capturing mechanical energy from human locomotion and converting it into electrical energy. Apparatus 200 is adapted to produce a revolving motion of the energy-producing chain inside the energy-producing channel, as described in detail below. As shown (and similar to the embodiment of FIG. 1), apparatus 200 comprises an energy-producing channel 201 that encloses an energy-producing chain (not shown) which can slide back and forth within channel 201. A set of energy-producing electrodes and energy-producing coils (not shown) are associated with (and perhaps embedded within the walls of) energy-producing channel 201. A pair of flexible chambers 203 and 204 are filled with an inert dielectric liquid (fluid), with chamber 203 located at the heel area and chamber 204 located at a front portion of a midsole 202. Chambers 203 and 204 are connected to energy-producing channel 201 via a pair of channels 206 and 205, configured as shown in FIG. 2.

During heel strike, chamber 203 is compressed and some of its fluid is displaced into channel 206. The resulting flow of the fluid enters energy-producing channel 201 through a pair of inlet ports 207 and 210, as shown. The fluid maintains its motion and then leaves energy-producing channel 201 via exit ports 208 and 209, as shown in FIG. 2, to collect in chamber 204. In this example, the flow of the fluid causes revolving motion of the energy-producing chain inside energy-producing channel 201 in the direction indicated by the arrows. During toe-off, the flow of the fluid is reversed causing revolving chain motion in the opposite direction. A detailed description of particular embodiments for providing circulating motion within an energy-harvesting channel is contained in U.S. patent application Ser. No. 13/859,824, filed by the inventors on Apr. 10, 2013 and herein incorporated by reference.

With this high level understanding of the ability of human locomotion to provide movement of a flexible chain within a flexible channel as controlled by chambers of inert fluid within heel and toe chambers, a more detailed discussion related to the various types of energy harvesting arrangements that may be formed within the structures of FIGS. 1 and 2 can be understood.

Figure 3:
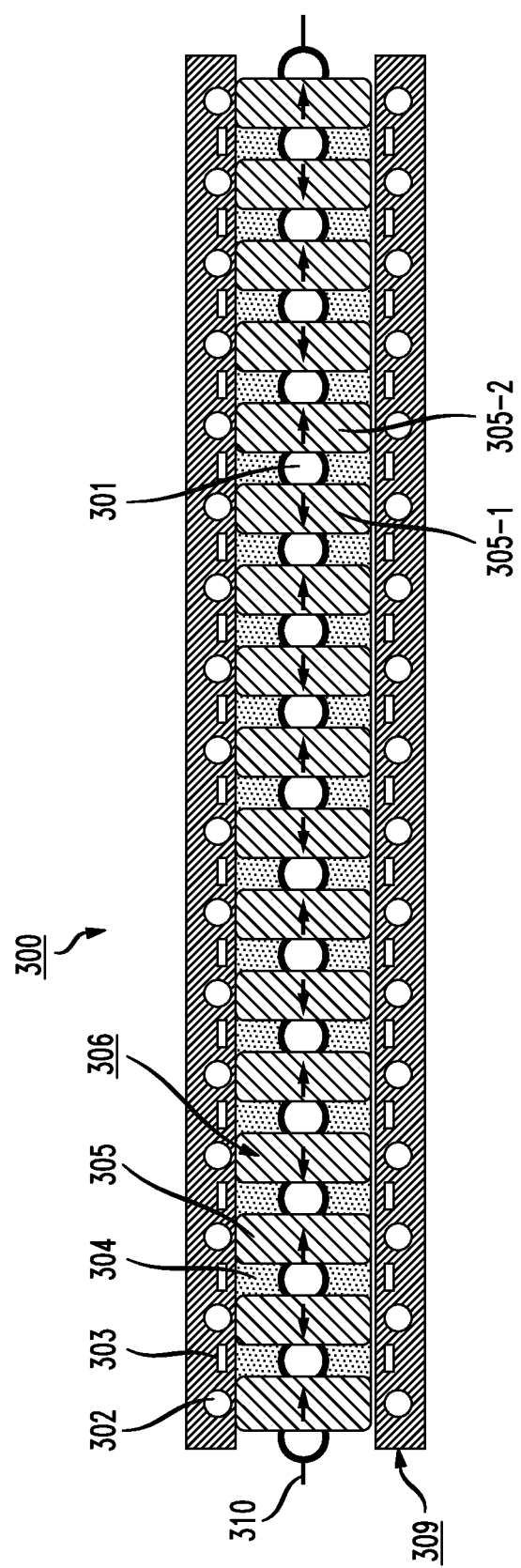
FIG. 3 illustrates an exemplary embodiment of a prior art energy harvesting arrangement, which includes a flexible energy-producing channel and a flexible energy-producing chain disposed within the channel.

Additionally, in order to better understand the advantages offered by the modular approach of the present invention, it is helpful to first consider various non-modular designs previously proposed by the current inventors. FIG. 3 illustrates an exemplary embodiment of a prior art (i.e., non-modular) energy harvesting arrangement, which includes a flexible energy-producing channel 309 and a flexible energy-producing chain 306. Flexible energy-producing chain 306 comprises a plurality of magnetic elements 305 that are affixed to a flexible string 310, with neighboring magnetic elements (for example, 305-1 and 305-2) separated by optional spacers 301. Neighboring magnetic elements (such as 305-1 and 305-2) are magnetized through their thickness in opposite directions and affixed to flexible string 310 in such a way that they are neither allowed to rotate around string 310 nor slide therealong. Lastly, flexible energy-producing chain 306 also includes a plurality of energy-producing conductive droplets 304 that are disposed between neighboring magnetic elements 305.

As shown in FIG. 3, energy-producing chain 306 is positioned within flexible energy-producing channel 309 and is surrounded by a plurality of dielectric-coated electrodes 303 and a separate plurality of conductive coils 302, with electrodes 303 and coils 302 disposed in an alternating pattern along the length of energy-producing channel 309 as shown (these elements may be embedded within the material forming channel 309, or disposed along an inner edge thereof). As magnetic elements 305 and conductive droplets 304 slide along channel 309, they generate electrical current each time they align with conductive coils 302 and dielectric electrodes 303, respectively. The mechanism of electrical current generation in conductive coils 302 is based on the Faraday's law of electromagnetic induction and is well known to those skilled in the art. The mechanism of electrical current generation in dielectric-coated electrodes 303 is provided via a capacitive charge and discharge cycle, as fully described in incorporated-by-reference U.S. Pat. Nos. 7,898,096 and 8,053,914.

Figure 4:
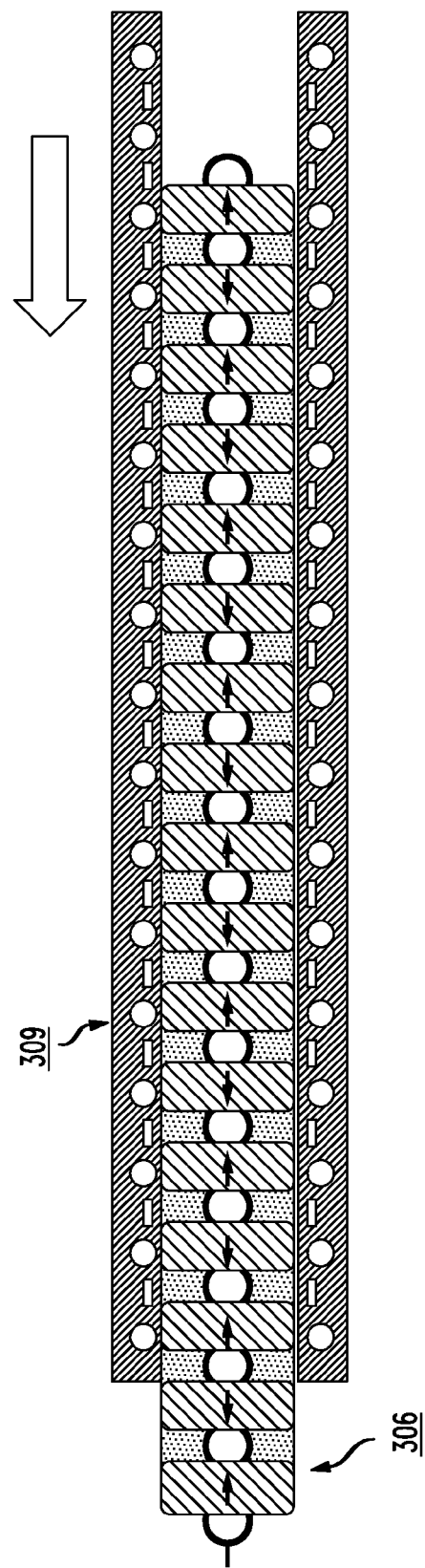
FIG. 4 illustrates the relative movement of energy-producing chain as it slides within energy-producing channel 309 during human locomotion for the arrangement of FIG. 3.

FIG. 4 illustrates the relative movement of energy-producing chain 306 as it slides within energy-producing channel 309 during human locomotion (for example), under the control of the hydraulic fluid movement as described above. In particular and with reference to FIGS. 1 and 2, it is the compressive force on the chambers that initiates and then sustains this movement (e.g., via human locomotion).

Figure 5:
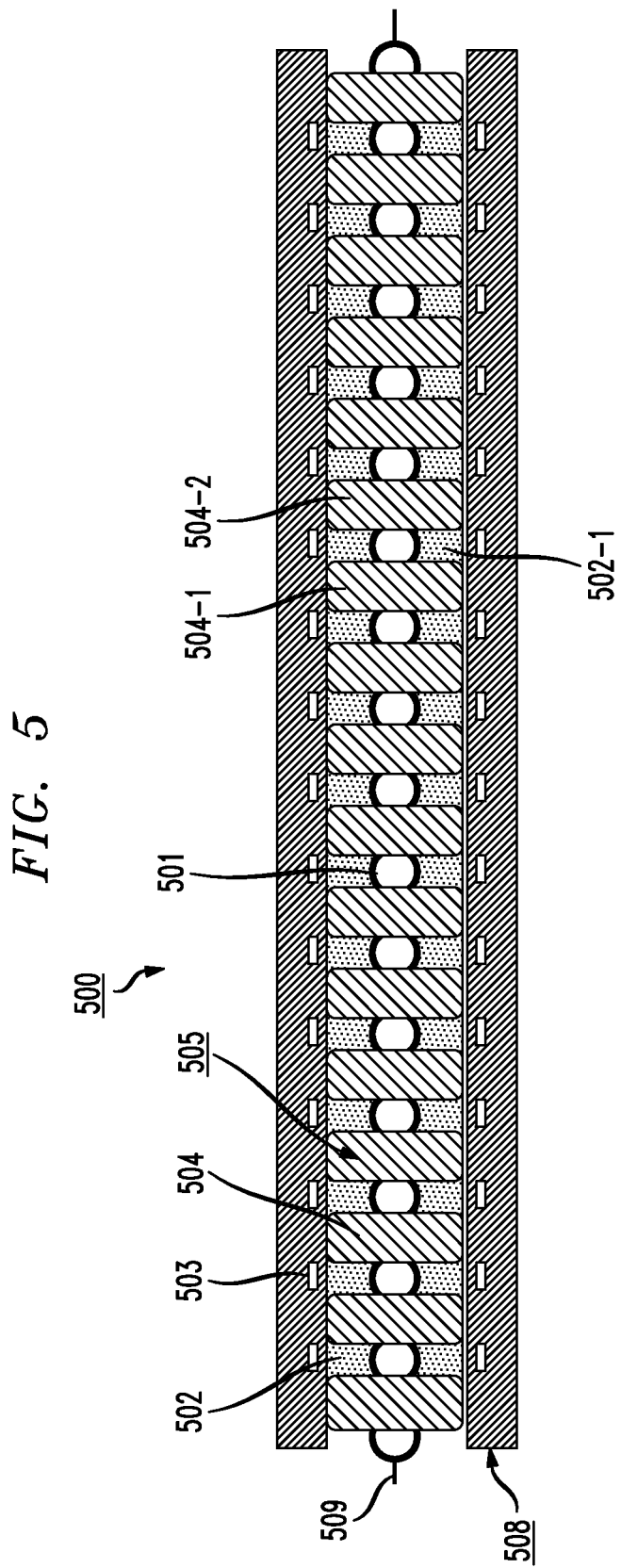
FIG. 5 illustrates an alternative prior art energy harvesting arrangement, in this case generating electrical current via a combination of dielectric-coated electrodes and conductive droplets.

FIG. 5 illustrates an alternative energy harvesting arrangement previously proposed by the current inventors, in this case generating electrical current via a combination of dielectric-coated electrodes and conductive droplets. In this example, an energy harvesting apparatus 500 includes a flexible energy-producing chain 505 that comprises a plurality of rigid elements 504 that are disposed along (and affixed to) a flexible string 509, with neighboring rigid elements 504 separated by optional spacers 501. In this embodiment, rigid elements 504 are not magnetized and are affixed to string 509 in such a way that they are neither allowed to rotate around string 509 nor slide therealong. As shown, flexible energy-producing chain 505 further comprises a plurality of energy-producing conductive droplets 502, with each separate droplet disposed between neighboring rigid elements (illustrated in FIG. 5 as conductive droplet 502-1 disposed between neighboring rigid elements 504-1 and 504-2). Flexible energy-producing chain 505 is disposed within a flexible channel 508, and is capable of sliding along within the interior of flexible channel 508 (as shown in FIG. 4, above).

Continuing with the description of this arrangement, flexible energy-producing chain 505 is shown as surrounded by a plurality of dielectric-coated electrodes 503, which are perhaps embedded within the flexible material forming channel 508 (this is only one scenario, it is also possible for the dielectric-coated electrodes to be a discrete component, separate from channel 508). As energy-producing conductive droplets 502 slide along channel 508, they generate electrical current in dielectric-coated electrodes 503 via capacitive charging and discharging (the mechanism of the electrical current generation in dielectric-coated electrodes 503 being fully described in U.S. Pat. Nos. 7,898,096 and 8,053,914).

Figure 6:
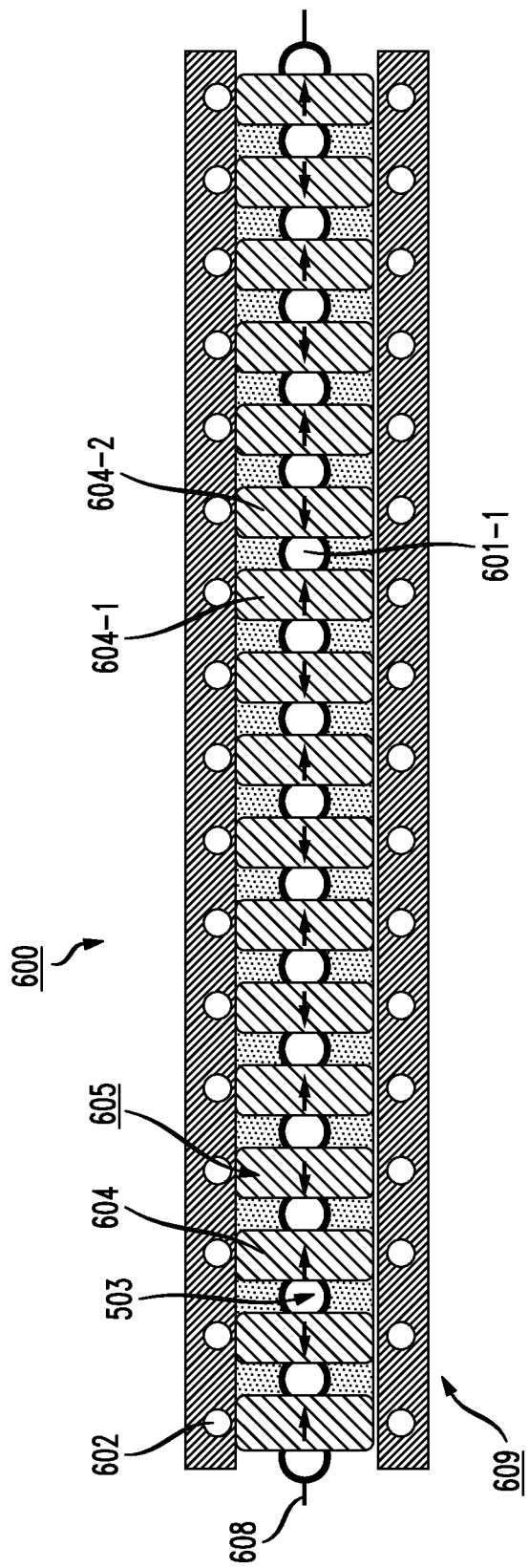
FIG. 6 illustrates yet another prior art energy harvesting arrangement, in this case using a combination of magnetic elements and conductive coils to generate energy via Faraday's law of electromagnetic induction.

FIG. 6 illustrates yet another energy harvesting arrangement previously proposed by the current inventors, in this case using a combination of magnetic elements and conductive coils to generate energy via Faraday's law of electromagnetic induction. As shown, arrangement 600 includes a flexible energy-producing chain 605 that comprises a plurality of magnetic elements 604, separated in this example by a plurality of spacers 601. Magnetic elements 604 are shown as affixed to a flexible string 608, with neighboring magnetic elements (such as 604-1 and 604-2) separated by optional spacer 601-1. Neighboring magnetic elements 604 are magnetized through their thickness in the opposite directions (as shown by the arrows on each element). Both magnetic chain elements 604 and spacers 601 are affixed to string 608 in such a way that they are neither allowed to rotate around string 608, nor to slide therealong.

Flexible energy-producing chain 605 is positioned within a flexible energy-producing channel 609, where energy-producing chain 605 is surrounded by a plurality of separate conductive coils 602. As magnetic elements 604 slide along channel 609, they generate electrical current as they pass within conductive coils 602. The mechanism of the electrical current generation in coils 602 is based on the Faraday's law of electromagnetic induction and is well known to those skilled in the art.

As can readily be understood from the discussion so far, these previously proposed "flexible" and non-modular energy harvesting arrangements comprise designs where the relative spacing between the dielectric-coated electrodes, conductive coils and energy-producing elements (including magnets and conductive droplets) are not rigidly fixed. Thus, these flexible arrangements do not guarantee accurate alignment between the chain elements and the electrodes and coils embedded in the channel walls, particularly in cases where substantial channel flexing occurs.

To address at least this problem, the present invention describes and discloses a "modular" energy harvesting arrangement that houses sets of the energy-producing chain elements (e.g., magnetic elements and/or conductive droplets) in separate, rigid modules. Therefore, the elements are fixed in place within the module and thus provide a fixed inter-element spacing. Similarly, sets of the energy-producing channel elements (e.g., dielectric-coated electrodes and/or conductive coils) are formed in separate, rigid segments of channel material, and are separated from one another by flexible segments of channel material. The resulting configuration is thus defined as a "modular" energy harvesting structure. Since the rigid modules are not going to flex, the alignment between the chain elements and the electrodes and coils embedded in the channel walls remain fixed, and are preserved at all times. The improved dimensional stability offered by the modules also allows for reduced spacing between the energy-producing elements, dielectric-coated coils and conductive electrodes, leading to higher filling factor and thus increased power density while the utilization of flexible segments between the individual rigid modules allows for the retention of the flexibility required when using human locomotion to provide for movement of the chain within the channel.

Figure 8A:
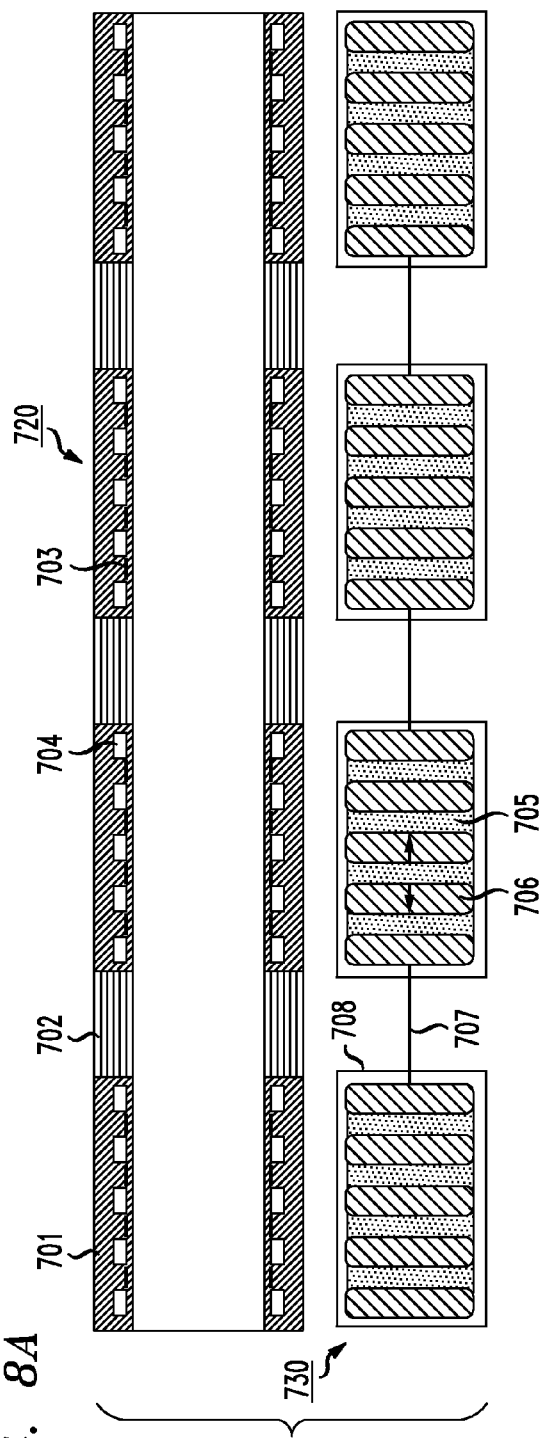
FIG. 8A separately illustrates the modular chain and modular channel of the arrangement of FIG. 7
Figure 8B:
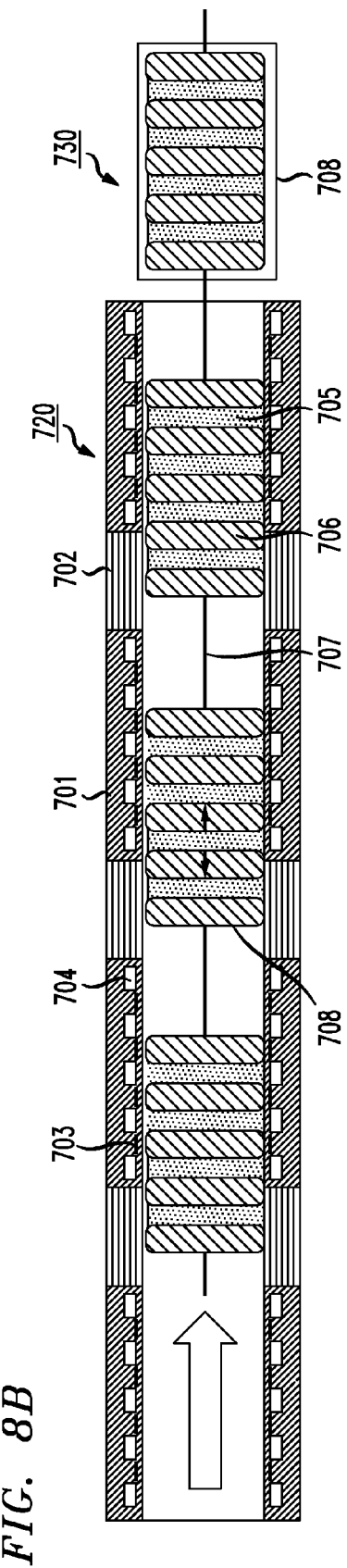
FIG. 8B illustrates the relatively movement of the modular chain within the modular channel for the arrangement of FIG. 7.

One exemplary embodiment of a modular-based energy harvesting system formed in accordance with the present invention is shown in FIGS. 7-9. As particularly illustrated in FIG. 7, an energy harvesting system 700 comprises a modular energy-producing channel 720 and a modular energy-producing chain 730, where modular energy-producing chain 730 is disposed within and slides along modular energy-producing channel 720 in a manner similar to the arrangements described above (the relative motion of chain 730 with respect to channel 720 is best shown in FIG. 8B). For the sake of clarity and discussion, energy-producing channel 720 and energy-producing chain 730 are separately illustrates in FIG. 8A, while FIG. 9 is an isometric view of this arrangement.

Referring to FIGS. 7-9, it is seen that modular energy-producing channel 720 is formed of a plurality of substantially rigid modules 701 separated by flexible channel segments 702 (where these flexible channel segments are defined as formed of segments of flexible tubing). Each rigid module 701 includes a set of dielectric-coated electrodes 703 and a set of conductive coils 704, disposed in an alternating arrangement. In accordance with this particular embodiment of the present invention, dielectric-coated electrodes 703 and conductive coils 704 are embedded within the rigid material forming module 701.

Modular energy-producing chain 730 is shown as comprising a plurality of substantially rigid modules 708 disposed along a flexible string 707 in a spaced-apart configuration. Rigid modules 708 are affixed to flexible string 707 in such a way that the individual rigid modules 708 cannot slide along flexible string 707. As shown, each rigid module 708 comprises a set of magnets 706 and a set of energy-producing conductive droplets 705 disposed in an alternating configuration, where neighboring magnets 706 are magnetized through their thickness in opposite directions (as schematically shown by the arrows on neighboring magnets 706-1 and 706-2).

In a preferred embodiment, magnets 706 are separated by rigid spacers (not shown) in such a way that they are not allowed to move with respect to each other. Such arrangement serves to fix the distance between magnets 706 and ensures the exact positioning of magnets 706 (as well as conductive droplets 705) within each module.

As magnets 706 and conductive droplets 705 slide along within energy-producing channel 730, they generate electrical current in conductive coils 704 and dielectric-coated electrodes 703, respectively. As with the various arrangements described above, the mechanism of the electrical current generation in coils 704 is based on the Faraday's law of electromagnetic induction and is well known to those skilled in the art. The mechanism of the electrical current generation in electrodes 703 is based on capacitive charging and discharging, as described in detail in U.S. Pat. Nos. 7,898,096 and 8,053,914.

Figure 9A:
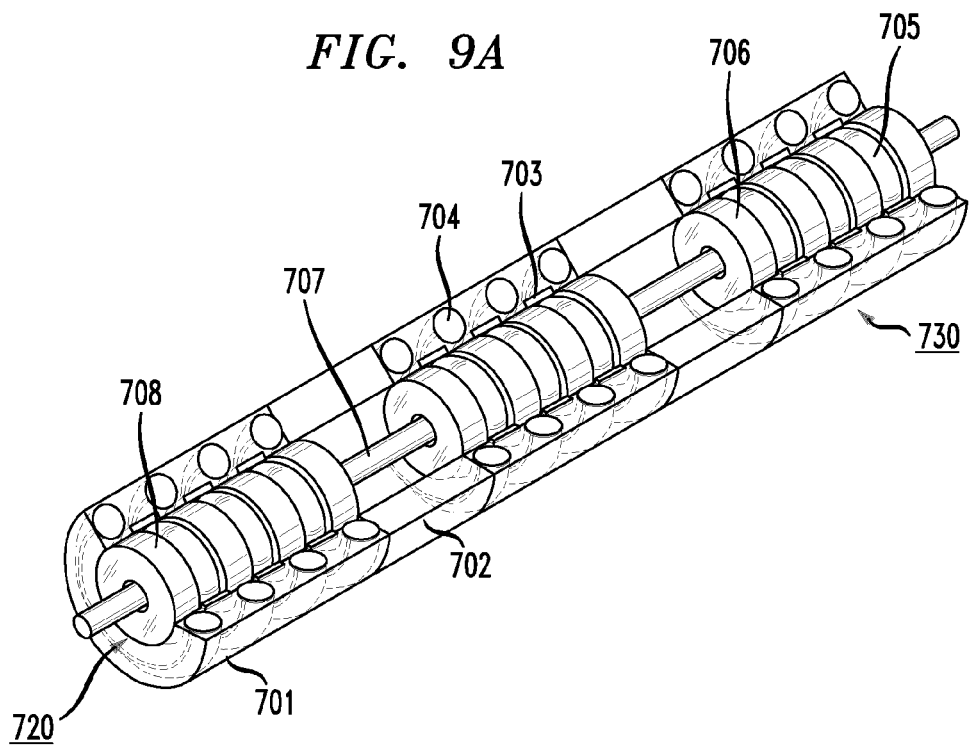
FIG. 9A is a cut-away isometric view of a portion of the energy harvesting arrangement of FIG. 7, in this view, the flexible tubing segments being in a "relaxed" (i.e., non-flexed) state.
Figure 9B:
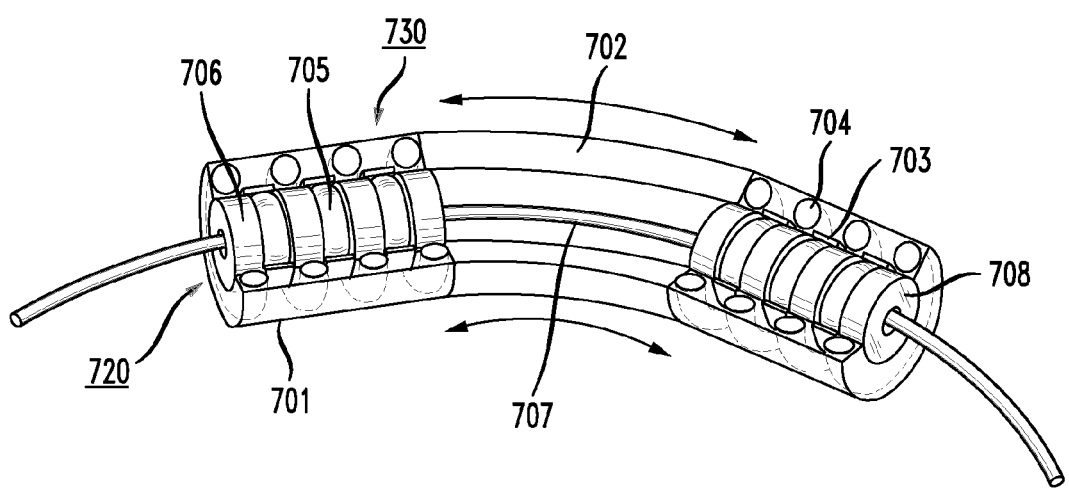
FIG. 9B is a cut-away isometric view of the same component as shown in FIG. 9A, in this case in a "flexed" arrangement, with the flexible tubing segment and flexible string providing for the desired movement of the apparatus, while maintaining alignment between the rigid modules of the chain and the channel.

A significant aspect of the present invention is the ability to retain a degree of flexibility in the modular energy harvesting structure, while creating improved energy efficiency by creating a configuration where the alignment between the energy-producing elements remains fixed and rigid. This aspect of the present invention can be understood by comparing the isometric view of FIG. 9A with the isometric view of FIG. 9B. FIG. 9A is an isometric view of the same structure as shown in FIG. 7, where the various components forming the modular assembly remain in a straight line. In contrast, FIG. 9B illustrates the same arrangement in a "curved" configuration. In this case, it is clear that as the energy-harvesting arrangement curves, portions of flexible channel 702 will be compressed, while other portions of flexible channel sections 702 will be stretched. The ability to use these flexible channel sections 702 to absorb these forces (along with flexible string 707 of chain 730) permits the inclusion of the more rigid modules for the actual energy generation function.

Figure 10:
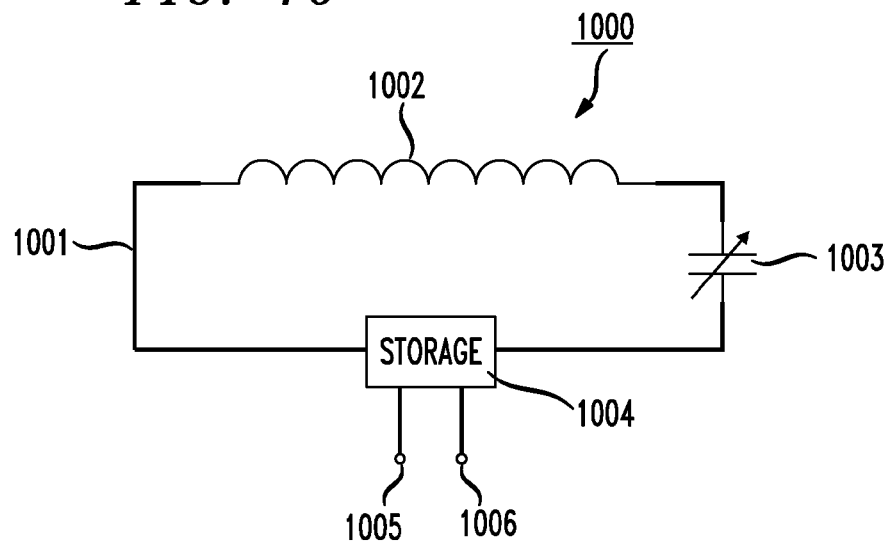
FIG. 10 contains a schematic diagram of an exemplary circuit that can be utilized to transmit the power generated by the exemplary modular energy harvester system shown FIG. 7, where the generated power is ultimately transferred to a useful load

FIG. 10 contains a schematic diagram of an exemplary circuit 1000 that can be utilized to transmit the power generated by the exemplary modular energy harvester system 700 shown FIG. 7, where the generated power is ultimately transferred to a useful load. As shown, circuit 1000 connects energy-producing inductor 1002 (i.e., the combination of conductive coil 704 and magnet 706) and the energy-producing capacitor 1003 (i.e., the combination of dielectric-coated electrode 703 and conductive droplet 705) to a power conditioning and energy storage means 1004. Several examples of the suitable power conditioning and energy storage means 1004 are described in U.S. Pat. Nos. 7,898,096 and 8,053,914. An electrical load (such as, for example, a cell phone, tablet device or the like) is shown as connected between output connectors 1005 and 1006 of power conditioning and energy storage means 1004.

Figure 11:
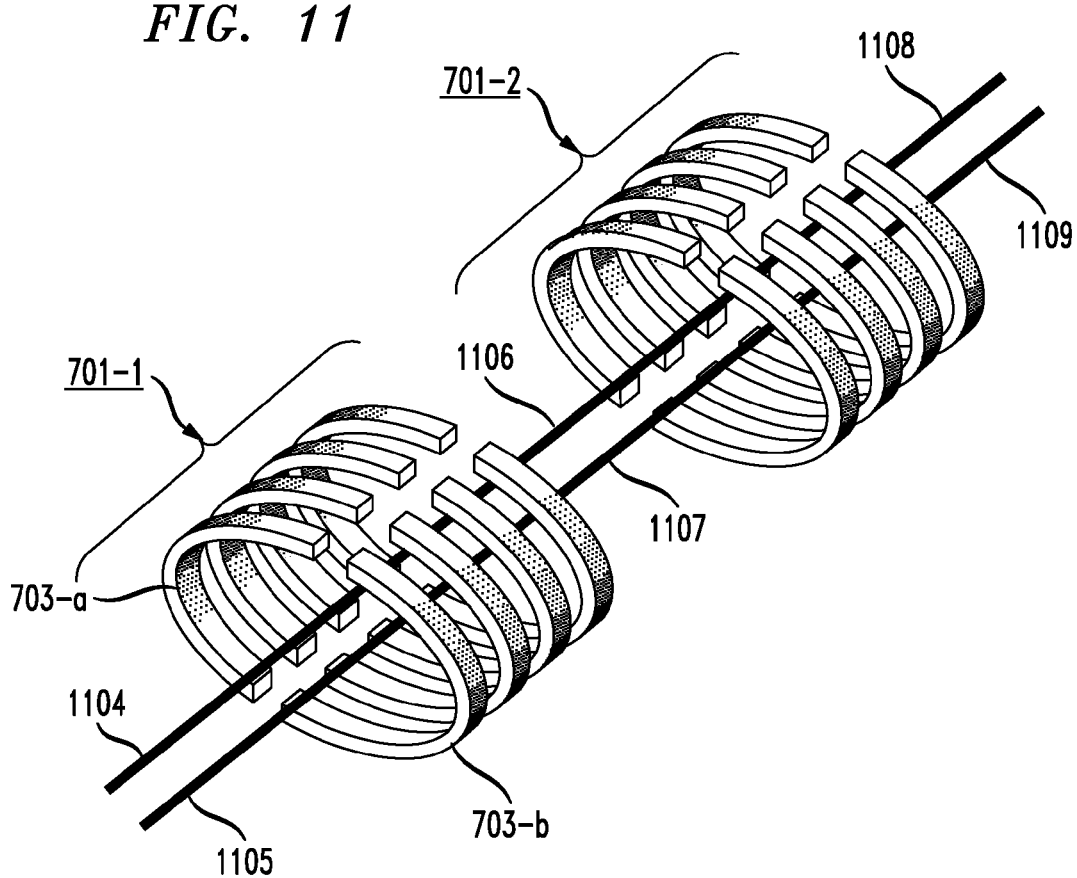
FIG. 11 shows an exemplary electrical connection between neighboring energy-producing dielectric-coated electrodes within neighboring rigid channel modules of the energy harvesting system as shown in FIGS. 7-9.

FIG. 11 shows an exemplary electrical connection between neighboring energy-producing dielectric-coated electrodes 703 within neighboring rigid channel modules 701-1 and 701-2 of energy harvesting system 700 as shown in FIGS. 7-9. In this particular embodiment, each dielectric-coated electrode is split in two halves (shown as 703-$a$ and 703-$b$) that are connected in parallel by conductors 1104-1109. It is important to note that since dielectric-coated electrodes 703 are embedded in rigid module 701 a very high packing density of dielectric-coated electrodes can be achieved without compromising their geometrical stability.

Figure 12:
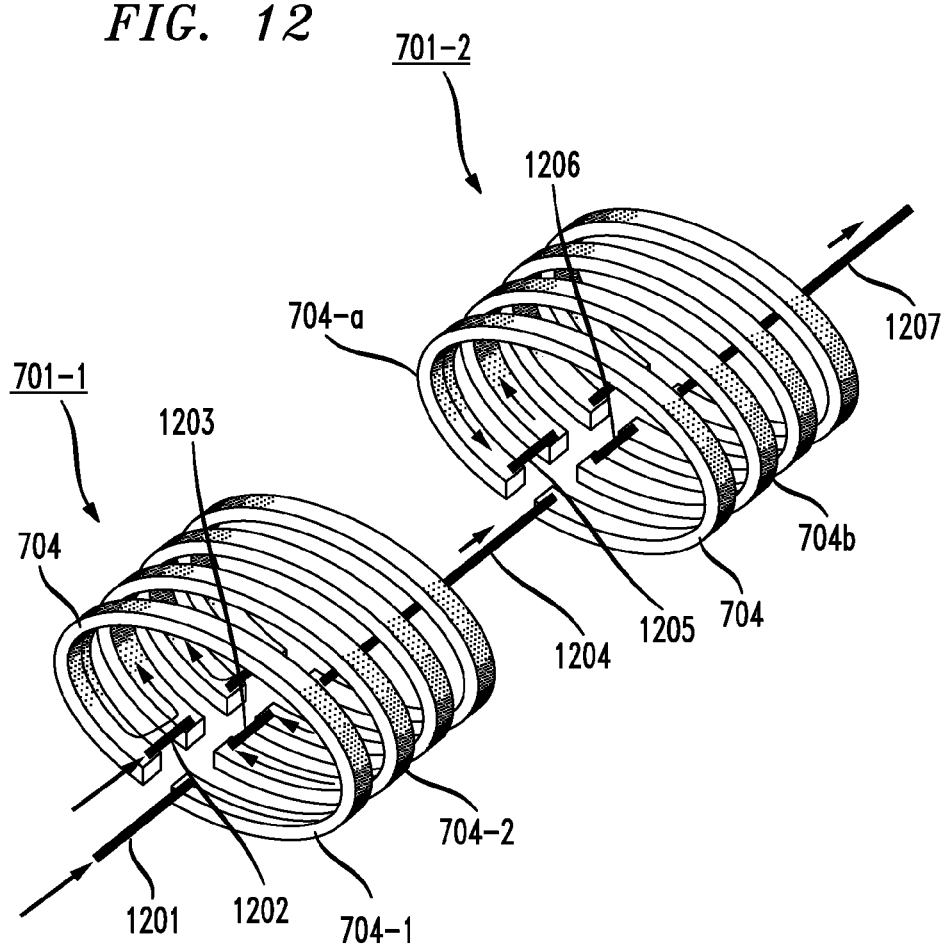
FIG. 12 shows an exemplary electrical connection between neighboring conductive coils within neighboring channel modules for energy harvesting system as shown in FIGS. 7-9.

FIG. 12 shows an exemplary electrical connection between neighboring conductive coils 704 within neighboring channel modules 701-1 and 701-2 for energy harvesting system 700 as shown in FIGS. 7-9. In FIG. 12, each conductive coil 704 is shown as having only one loop, but those of ordinary skill in the art would understand that arrangements with multiple loops in each coil can be advantageously utilized as well. It is important to note that since conductive coils 704 are embedded in rigid module 701, a very high packing density of conductive coils 704 can be achieved without compromising their geometrical stability.

In the arrangement of FIG. 12, an electrical current will pass along an input conductor 1201, and then travel along a first coil segment 704-1 and into a first stub conductor 1202, as shown by the arrows. The current will continue to circulate in a similar manner along each coil segment and stub conductor (such as illustrated stub conductor 1203), ultimately appearing along a channel conductor 1204. The current will then enter module 701-2, and travel along the electrical path consisting of the coil segments (such as 704-$a$ and 704-$b$) and the stub conductors (such as 1205 and 1206), appearing thing along channel conductor 1207.

As mentioned above, and in association with the ability to achieve a high packing density of conductive coils 704, FIGS.

Figure 13:
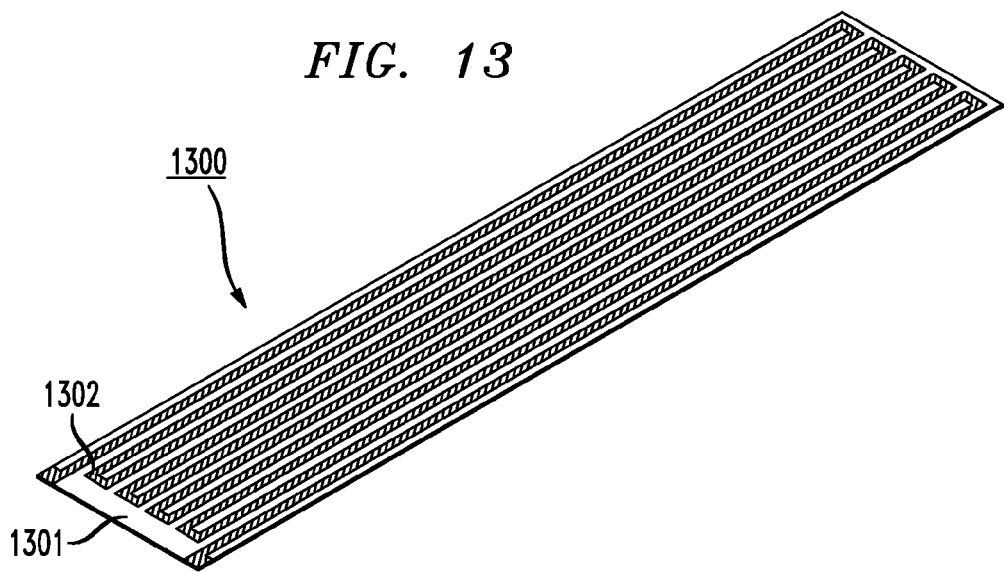
FIG. 13 schematically shows one exemplary embodiment of a flexible circuit board that may be utilized to create a rigid channel module in an energy harvester of the present invention.

13-15 illustrate an alternative configuration of a rigid module that may be formed to include these coils. In particular, FIG. 13 schematically shows one exemplary embodiment of a flexible circuit board 1300 that may be utilized to create a rigid module in an energy harvester of the present invention. In particular, circuit board 1300 consists of a plurality of interconnected metal traces 1302 that have been laminated to a flexible dielectric film 1301. Circuit board 1300 is illustrated in FIG. 13 in its initial planar state.

Figure 14:
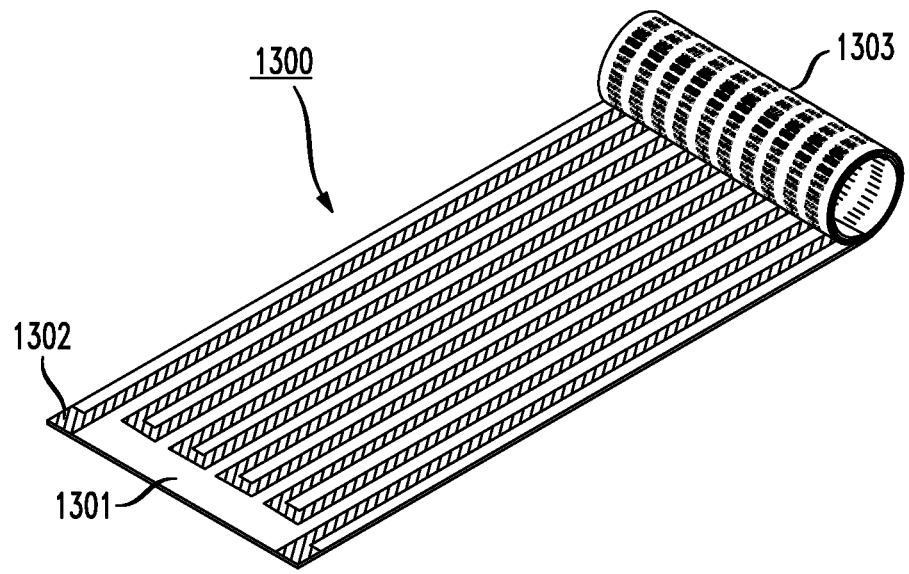
FIG. 14 shows an exemplary process of rolling the flexible circuit board of FIG. 13 into a rigid cylindrical module.

FIG. 14 shows an exemplary process of rolling flexible circuit board 1300 into a rigid cylindrical module. Flexible dielectric film 1301 forms the walls of the rigid module, while traces 1302 form interconnected coils.

Figure 15:
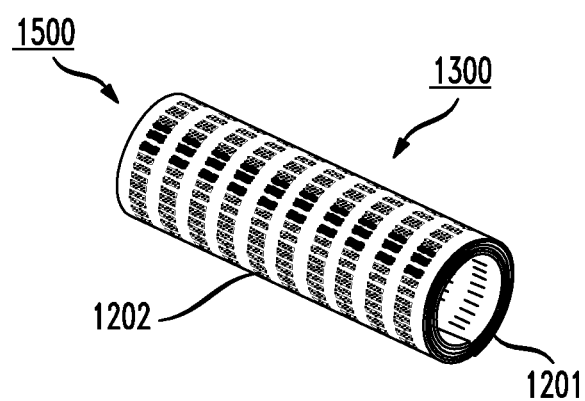
FIG. 15 shows a completed rigid cylindrical channel module that has been formed from flexible circuit board.

FIG. 15 shows a completed rigid cylindrical module 1500 that has been formed from flexible circuit board 1300. As shown, flexible dielectric film 1301 forms the walls of module 1500, while traces 1302 form a set of interconnected coils. While this specific flexible circuit arrangement illustrates the formation of conductive "coils" (in the form of traces), it is to be understood that an alternative flexible circuit arrangement may be formed to include the dielectric-coated electrodes (e.g., a layer of conductive traces sandwiched between a pair of flexible circuit boards made of dielectric material). Obviously, a flexible substrate configuration that includes both a coil structure and a dielectric-coated electrode may be created.

Figure 16:
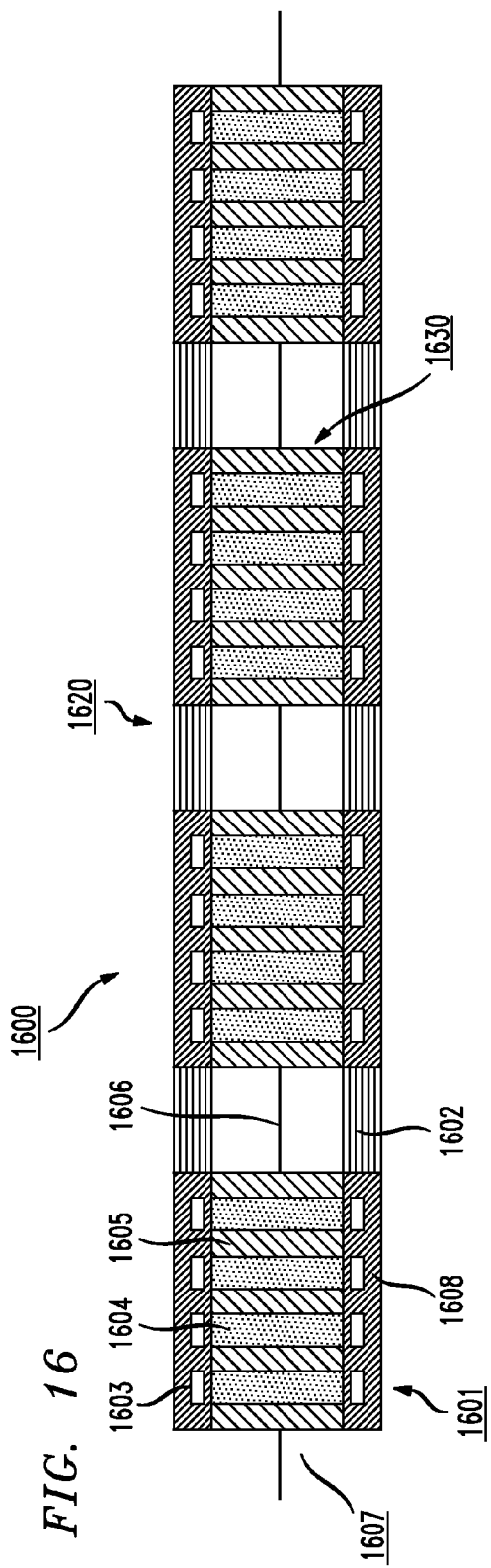
FIG. 16 illustrates another embodiment of a modular energy harvesting apparatus formed in accordance with the present invention, where in this embodiment the energy-producing channel comprises a set of rigid modules housing dielectric-coated electrodes and the energy-producing chain comprises a set of rigid modules housing conductive droplets.

Another exemplary embodiment of an energy harvesting system 1600 using a combination of a modular-based energy-producing channel and a modular-based energy-producing chain of the present invention is shown in FIG. 16. In this embodiment, an energy-producing channel 1620 comprises a plurality of spaced-apart, substantially rigid modules 1601, with a separate flexible channel segment 1602 disposed between adjacent rigid modules 1601. Each rigid module 1601 includes a set of dielectric-coated electrodes 1603 that which are embedded within the rigid wall material forming module 1601 (or, alternatively, formed as a "rolled" module based upon a flexible circuit board, as discussed above in FIGS. 13-15).

Likewise, an energy-producing chain 1630 comprises a plurality of substantially rigid modules 1607 affixed in a spaced-apart configuration along a flexible string 1606. In accordance with the present invention, rigid modules 1607 are affixed to flexible string 1606 in such a way that they cannot slide along flexible string 1606. Each rigid module 1607 comprises a set of rigid spacers 1605 and a set of energy-producing droplets 1604, placed in an alternating pattern. Rigid spacers 1605 are not magnetized and are used to maintain a constant, fixed spacing between adjacent droplets such that the droplets will align with the dielectric-coated electrodes when rigid modules 1601 and 1607 overlap as chain 1630 slides within channel 1620. The spacers may be separated by rigid separators (not shown) in such a way that they are not allowed to move with respect to each other.

In accordance with the present invention, the arrangement as shown in FIG. 16 serves to fix the distance between the droplets and guarantees the exact positioning of the spacers and droplets within each module. As the energy-producing droplets slide along the channel they generate electrical current in dielectric-coated electrodes 1603 via capacitive charging and discharging. The mechanism of electrical current generation in dielectric-coated electrodes 1603 is described in detail in U.S. Pat. Nos. 7,898,096 and 8,053,914.

Figure 17:
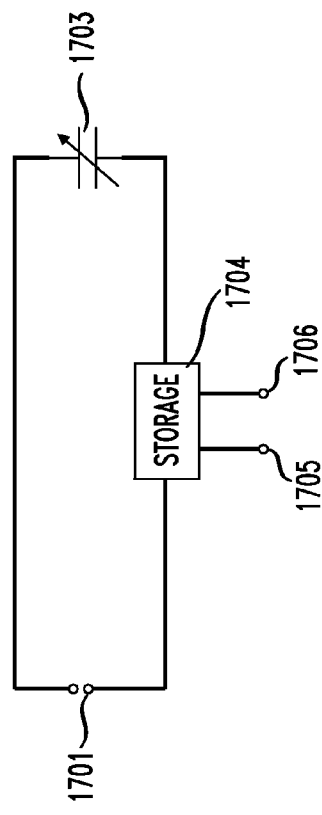
FIG. 17 contains a basic schematic diagram of an electric circuit that models the action of an energy harvester formed as shown in FIG. 16.

FIG. 17 contains a basic schematic diagram of an electric circuit 1700 that models the action of an energy harvester formed as shown in FIG. 16. As shown, circuit 1700 includes a bias voltage source 1701. The combined action of energy-producing conductive droplets 1604 and dielectric-coated electrodes 1603 of FIG. 16 are represented by a variable capacitor 1703 in FIG. 17. Voltage source 1701 and variable capacitor 1703 are coupled to an exemplary power conditioning and energy storage means 1704. Several examples of a suitable bias voltage source 1701 and power conditioning and energy storage means 1704 are described in U.S. Pat. Nos. 7,898,096 and 8,053,914. An electric load (cell phone, tablet, or the like) can be coupled between output connectors 1705 and 1706 of power conditioning and energy storage means 1704.

Figure 18:
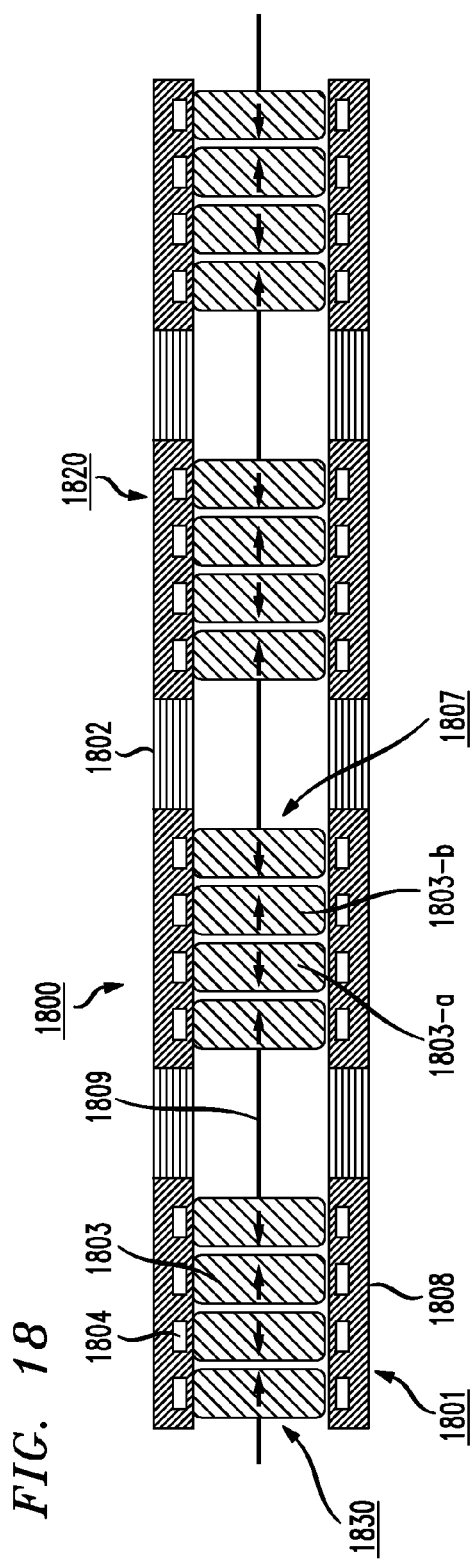
FIG. 18 illustrates yet another embodiment of a modular energy harvesting apparatus formed in accordance with the present invention, where in this embodiment the energy-producing channel comprises a set of rigid modules housing conductive coils and the energy-producing chain comprises a set of rigid modules housing magnets of alternating polarity.

Yet another exemplary embodiment of an energy harvesting system formed in accordance with the present invention that utilizes a combination of a modular-based energy-producing channel and a modular-based energy-producing chain is shown in FIG. 18 as energy harvesting system 1800. In this particular embodiment, an energy-producing channel 1820 comprises a plurality of spaced-apart, substantially rigid modules 1801 that are disposed in sequence and separated by a plurality of flexible channel segments 1802. Each rigid module 1801 comprises a set of conductive coils 1804 that are embedded in a substantially rigid wall forming module 1801 (or, alternatively, formed as a flexible circuit board as described above).

Likewise, an energy-producing chain 1830 comprises a plurality of substantially rigid modules 1807 that are permanently affixed to a flexible string 1809 in a spaced-apart relationship (modules 1807 affixed in such a way that they are not allowed to slide along string 1809). Each module 1807 comprises a set of magnets 1803, where neighboring magnets (such as 1803-*a* and 1803-*b*) are magnetized through their thickness in the opposite directions. Neighboring magnets 1803 are separated from one another by rigid separators (not shown) in such a way that they cannot move with respect to one another. Such arrangement serves to fix the distance between the magnets and guarantees the exact positioning of the magnets within each module.

As energy-producing chain 1830 slides along within energy-producing channel 1820, magnets 1803 generate electrical current in associated conductive coils 1804. The mechanism of the electrical current generation in coils 1804 is based on the Faraday's law of electromagnetic induction and is well known to those skilled in the art.

Figure 19:
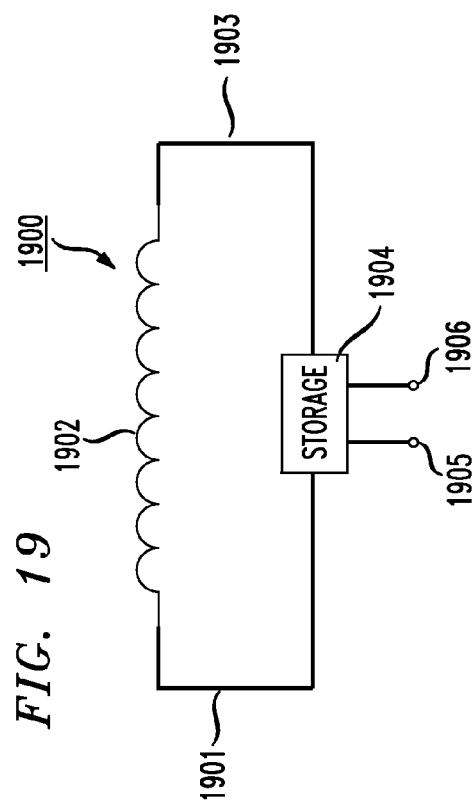
FIG. 19 is a schematic circuit diagram of an electrical circuit that represents the generation of electrical energy utilizing energy harvesting system of FIG. 18.

FIG. 19 is a schematic circuit diagram of an electrical circuit 1900 that represents the generation of electrical energy utilizing energy harvesting system 1800 of FIG. 18. As shown, circuit connects the energy-producing coils 1902 to a power conditioning and energy storage means 1904. Several examples of the suitable power conditioning and energy storage means 1904 are described in U.S. Pat. Nos. 7,898,096 and 8,053,914. The useful electrical load can be connected to the output connectors 1905 and 1906 of power conditioning and energy storage means 1904.

As an additional feature of the modular arrangement of the present invention, it has been discovered that the utilization of a rigid channel module has permitted the inclusion of a magnetic shield in those structures that utilize combinations of a conductive coil and magnets to harvest electrical energy. The magnetic shield is used in accordance with the present invention to essentially "trap" the magnetic flux associated with the magnets, allowing for the field within the adjacent coils to be strong; that is, there is relatively little or no flux leakage outside of the module.

In embodiments that utilize a rigid housing for creating the channel modules (such as shown in the embodiment of FIG. 7, for example), the exterior surface of the module can be coated with a material that provides this type of shield. In embodiments that utilize a flexible circuit board (as described above in association with FIGS. 13-15), a simple modification to the circuit board structure may be utilized to create the desired magnetic shield.

Figure 20B:
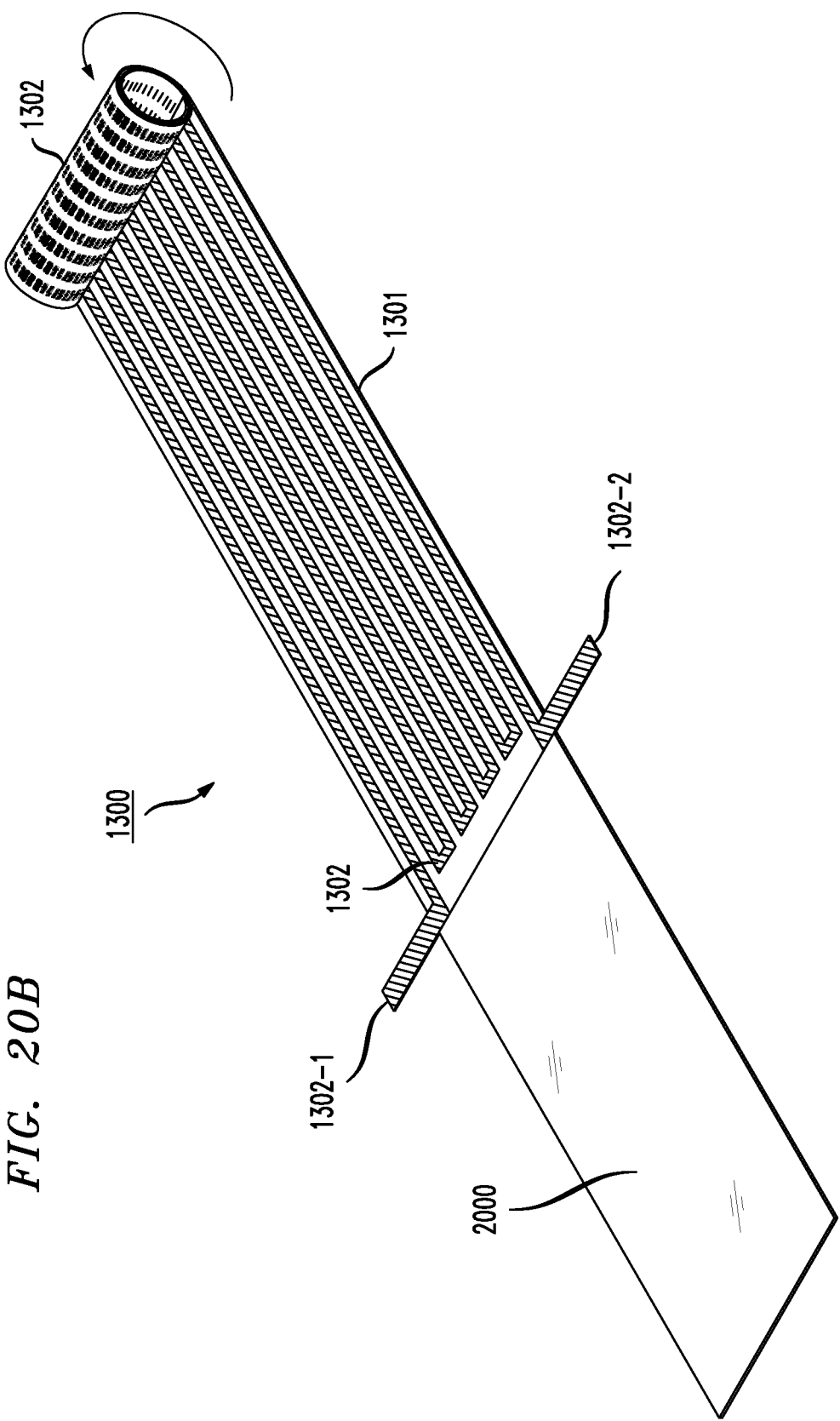

FIGS. 20A-20D illustrate a set of steps that may be used to create a shielded "flex" channel module in accordance with the present invention, With reference to FIG. 20A, a planar arrangement of the initial channel module is shown, including a flexible circuit board 1300 as described above. In this case, metallic trace 1302 is shown to include a pair of end connectors 1302-1 and 1302-2. Attached to end termination of circuit board 1300 is a sheet of a pliable magnetic shielding material (for example, a mu-metal sheet).

Figure 20C:
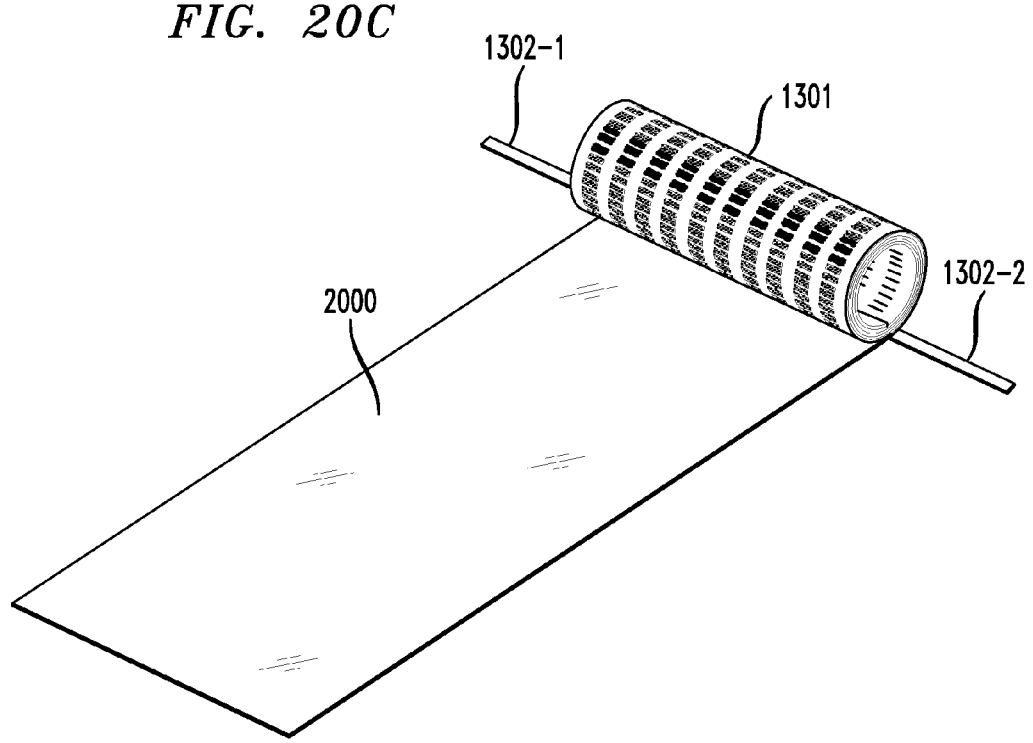
Figure 20D:
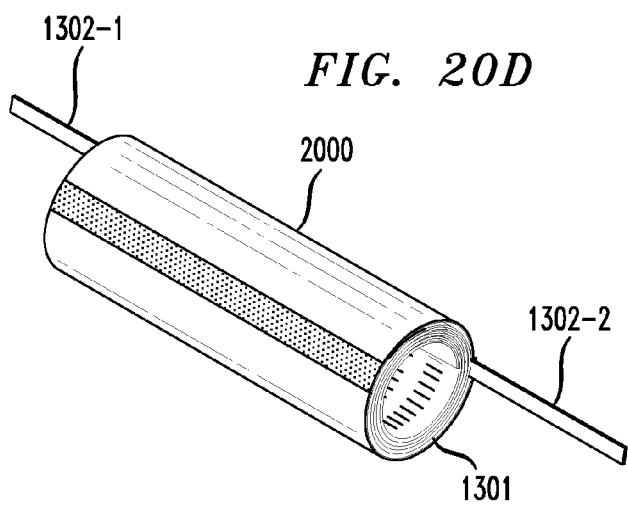

As with the arrangement shown in FIGS. 13-15, the channel module is formed by rolling the flexible circuit board in the manner shown in FIG. 20B. Unlike the arrangement as discussed above, the rolling is continued onto shield 2000, as shown in FIG. 20C, until the final structure is formed, as shown in FIG. 20D.

Although only several preferred embodiments of the present invention has been described in detail here, those of ordinary skill in the art should understand that they could make various changes, substitutions and alterations herein without departing from the scope of the invention. In particular, only one exemplary embodiment of the expanding assembly of chain elements is discussed in detail here. However, those of ordinary skill in the art should understand that other embodiments of expanding assemblies of elements based on elastic polymeric materials, mechanical springs, etc. can be advantageously utilized without departing from the scope of the current invention.

What is claimed is:

1. A modular apparatus for converting mechanical energy into electrical energy comprising
   an energy-producing channel comprising a plurality of rigid channel modules longitudinally disposed along the channel, with adjacent rigid channel modules separated by a section of flexible tubing, each rigid channel module including either one or both of a plurality of dielectric-coated electrodes and a plurality of conductive coils; and
   an energy-producing chain disposed within the energy-producing channel and comprising a plurality of rigid chain modules disposed along and attached to a flexible string in a spaced-apart manner, each rigid chain module including either one or both of a plurality of magnets disposed in an alternating polarity configuration and a plurality of conductive droplets,
   wherein the movement of the energy-producing chain within the energy-producing channel provides for alignment between the plurality of rigid channel modules with the plurality of rigid chain modules, generating electrical energy by the alignment, while permitting flexing of the modular apparatus by the permissible movement of the sections of flexible tubing and the flexible string; and utilization of rigid modules in both the channel and the chain function to eliminate flexing of the channel and maintain alignment between energy-producing elements within the chain modules with energy-producing elements within the channel modules.

2. An apparatus as defined in claim 1 wherein each rigid channel module includes a plurality of conductive coils and each rigid chain module includes a plurality of magnets, the combination creating electromagnetic energy as the energy-producing chain slides along within the energy-producing channel.

3. An apparatus as defined in claim 2 wherein at least one rigid channel module further comprises a magnetic shield disposed around an outer surface thereof, the magnetic shield trapping the flux from the aligned magnets in a rigid chain module and improve the conversion efficiency of the energy created by the movement of the energy-producing chain within the energy-producing channel.

4. An apparatus as defined in claim 2 wherein at least one rigid channel module comprises a flexible circuit board, including a plurality of surface metal traces, the flexible circuit board being rolled into a cylindrical form to create a rigid channel module that is incapable of flexing, with the metal traces forming the conductive coils.

5. An apparatus as defined in claim 4 wherein the apparatus further comprises a sheet of magnetic shielding material attached to an end of the flexible circuit board such that as the board is rolled into cylindrical form, the sheet of magnetic shielding material forms an outer surface of the cylinder.

6. An apparatus as defined in claim 5 wherein the magnetic material comprises a sheet of mu-metal material.

7. An apparatus as defined in claim 1 wherein each rigid channel module includes a plurality of dielectric-coated electrodes and each rigid chain module includes a plurality of spaced-apart conductive droplets, the combination creating electrostatic energy in the presence of a bias voltage applied across opposing electrodes within the plurality of dielectric-coated electrodes when the rigid chain modules align with the rigid channel modules as the energy-producing chain moves along within the energy-producing channel.

8. An apparatus as defined in claim 7 wherein at least one rigid channel module comprises a flexible circuit board, the flexible circuit board formed of a dielectric material and having embedded therein a plurality of metal traces, the flexible circuit board being rolled into a cylindrical form to create a rigid channel module that is incapable of flexing, with the metal traces forming the dielectric-coated conductors.

9. An apparatus as defined in claim 1 wherein
   each rigid channel module includes a plurality of conductive coils and a plurality of dielectric-coated electrodes, disposed in an alternating configuration; and
   each rigid chain module includes a plurality of magnets and a plurality of conductive droplets, disposed in an alternating configuration.

10. A method of converting mechanical energy into electrical energy comprising:
   providing a chain of energy-producing rigid chain modules disposed in a spaced-apart relationship along a flexible string, each rigid chain module including either one or both of a plurality of magnets disposed in an alternating polarity configuration and a plurality of conductive droplets;
   providing a energy-producing channel comprising a plurality of rigid channel modules separated by a plurality of flexible sections of tubing, each rigid module including either one or both of a plurality of dielectric-coated electrodes and a plurality of conductive coils;
   inserting the energy-producing chain into the energy-producing channel; and
   using mechanical energy to translate the position of the chain with respect to the channel such that electromagnetic energy is created when the magnetic elements align and misalign with individual coils of the plurality of coils and electrostatic energy is created when the conductive droplets align and misalign with individual dielectric-coated electrodes of the plurality of dielectric-coated electrodes, the utilization of rigid modules in both the channel and the chain functioning to eliminate flexing of the modules and maintain alignment between energy-producing elements within the chain modules with energy-producing elements within the channel modules.

* * * * *